United States Patent
Vyas et al.

(10) Patent No.: US 10,845,975 B2
(45) Date of Patent: Nov. 24, 2020

(54) INTERACTIVE ANIMATED CHARACTER HEAD SYSTEMS AND METHODS

(71) Applicant: Universal City Studios LLC, Universal City, CA (US)

(72) Inventors: Anisha Vyas, Orlando, FL (US); Travis Jon Cossairt, Celebration, FL (US); Wei Cheng Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 180 days.

(21) Appl. No.: 15/939,887

(22) Filed: Mar. 29, 2018

(65) Prior Publication Data

US 2019/0302991 A1    Oct. 3, 2019

(51) Int. Cl.
*G06F 3/0484* (2013.01)
*H04W 4/02* (2018.01)
(Continued)

(52) U.S. Cl.
CPC ........ *G06F 3/04847* (2013.01); *A63F 13/216* (2014.09); *A63F 13/24* (2014.09); *A63F 13/28* (2014.09); *A63F 13/428* (2014.09); *A63F 13/67* (2014.09); *A63F 13/79* (2014.09); *A63F 13/95* (2014.09); *A63G 31/00* (2013.01); *A63H 13/005* (2013.01); *A63J 19/006* (2013.01); *G08C 17/02* (2013.01); *H04W 4/023* (2013.01);
(Continued)

(58) Field of Classification Search
CPC ........ A63F 13/216; A63F 13/24; A63F 13/28; A63F 13/428; A63F 13/67; A63F 13/79; A63F 13/95; A63G 31/00; A63H 13/005; A63J 19/006; G06F 3/013; G06F 3/04847; G06K 19/0723; G06K 7/10366; G08C 17/02; G08C 2201/34; H04W 4/023
See application file for complete search history.

(56) References Cited

U.S. PATENT DOCUMENTS

| 4,660,033 A | 4/1987 | Brandt |
| 5,946,444 A | 8/1999 | Evans et al. |
(Continued)

FOREIGN PATENT DOCUMENTS

| CN | 2598084 Y | 1/2004 |
| JP | 2003288472 A | 10/2003 |
(Continued)

OTHER PUBLICATIONS

Slyper, Ronit, et al., "A Tongue Input Device for Creating Conversations," UIST'11, Oct. 16-19, 2011, ACM, 9 pgs.
(Continued)

*Primary Examiner* — Michael J Huntley
(74) *Attorney, Agent, or Firm* — Fletcher Yoder, P.C.

(57) ABSTRACT

An interactive system includes one or more processors that are configured to receive a first signal indicative of an activity of a user within an environment and to receive a second signal indicative of the user approaching an animated character head. The one or more processors are also configured to provide information related to the activity of the user to a base station control system associated with the animated character head in response to receipt of the second signal to facilitate a personalized interaction between the animated character head and the user.

23 Claims, 4 Drawing Sheets

(51) Int. Cl.
  *G08C 17/02* (2006.01)
  *A63J 19/00* (2006.01)
  *A63F 13/79* (2014.01)
  *A63F 13/428* (2014.01)
  *A63H 13/00* (2006.01)
  *A63F 13/28* (2014.01)
  *A63F 13/95* (2014.01)
  *A63F 13/216* (2014.01)
  *A63F 13/24* (2014.01)
  *A63G 31/00* (2006.01)
  *A63F 13/67* (2014.01)
  *G06K 19/07* (2006.01)
  *G06F 3/01* (2006.01)
  *G06K 7/10* (2006.01)

(52) U.S. Cl.
  CPC .......... *G06F 3/013* (2013.01); *G06K 7/10366* (2013.01); *G06K 19/0723* (2013.01); *G08C 2201/34* (2013.01)

(56) References Cited

U.S. PATENT DOCUMENTS

| | | |
|---|---|---|
| 6,142,368 A | 11/2000 | Mullins et al. |
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 7,997,991 B2 | 8/2011 | Kanemaru et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,371,893 B2 | 2/2013 | Eck et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,517,788 B2 | 8/2013 | Eck et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,801,488 B2 | 8/2014 | Irmler |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |

(56) References Cited

U.S. PATENT DOCUMENTS

| | | | |
|---|---|---|---|
| 8,821,238 | B2 | 9/2014 | Ackley et al. |
| 8,827,810 | B2 | 9/2014 | Weston et al. |
| 8,830,030 | B2 | 9/2014 | Arthurs et al. |
| 8,851,372 | B2 | 10/2014 | Zhou et al. |
| 8,866,673 | B2 | 10/2014 | Mendelson |
| 8,870,641 | B2 | 10/2014 | Dabrowski |
| 8,888,576 | B2 | 11/2014 | Briggs et al. |
| 8,913,011 | B2 | 12/2014 | Barney et al. |
| 8,915,785 | B2 | 12/2014 | Barney et al. |
| 8,917,172 | B2 | 12/2014 | Charych |
| 8,923,994 | B2 | 12/2014 | Laikari et al. |
| 8,924,432 | B2 | 12/2014 | Richards et al. |
| 8,937,530 | B2 | 1/2015 | Smith et al. |
| 8,961,260 | B2 | 2/2015 | Weston |
| 8,961,312 | B2 | 2/2015 | Barney et al. |
| 8,971,804 | B2 | 3/2015 | Butler |
| 8,972,048 | B2 | 3/2015 | Canora et al. |
| 9,002,264 | B2 | 4/2015 | Zhang |
| 9,021,277 | B2 | 4/2015 | Shearer et al. |
| 9,039,533 | B2 | 5/2015 | Barney et al. |
| 9,072,965 | B2 | 7/2015 | Kessman et al. |
| 9,087,246 | B1 | 7/2015 | Chin et al. |
| 9,109,763 | B1 | 8/2015 | Wein |
| 9,122,964 | B2 | 9/2015 | Krawczewicz |
| 9,130,651 | B2 | 9/2015 | Tabe |
| 9,138,650 | B2 | 9/2015 | Barney et al. |
| 9,149,717 | B2 | 10/2015 | Barney et al. |
| 9,162,148 | B2 | 10/2015 | Barney et al. |
| 9,162,149 | B2 | 10/2015 | Weston et al. |
| 9,178,569 | B2 | 11/2015 | Chakravarty et al. |
| 9,186,585 | B2 | 11/2015 | Briggs et al. |
| 9,196,964 | B2 | 11/2015 | Baringer |
| 9,207,650 | B2 | 12/2015 | Narendra et al. |
| 9,215,592 | B2 | 12/2015 | Narendra et al. |
| 9,225,372 | B2 | 12/2015 | Butler |
| 9,232,475 | B2 | 1/2016 | Heinzelman et al. |
| 9,245,158 | B2 | 1/2016 | Gudan et al. |
| 9,272,206 | B2 | 3/2016 | Weston et al. |
| 9,318,898 | B2 | 4/2016 | John |
| 9,320,976 | B2 | 4/2016 | Weston |
| 9,367,852 | B2 | 6/2016 | Canora et al. |
| 9,383,730 | B2 | 7/2016 | Prestenback |
| 9,393,491 | B2 | 7/2016 | Barney et al. |
| 9,393,500 | B2 | 7/2016 | Barney et al. |
| 9,411,992 | B1 | 8/2016 | Marek et al. |
| 9,412,231 | B2 | 8/2016 | Dabrowski |
| 9,413,229 | B2 | 8/2016 | Fleming |
| 9,424,451 | B2 | 8/2016 | Kalhous et al. |
| 9,438,044 | B2 | 9/2016 | Proud |
| 9,443,382 | B2 | 9/2016 | Lyons |
| 9,446,319 | B2 | 9/2016 | Barney et al. |
| 9,463,380 | B2 | 10/2016 | Weston et al. |
| 9,468,854 | B2 | 10/2016 | Briggs et al. |
| 9,474,962 | B2 | 10/2016 | Barney et al. |
| 9,480,929 | B2 | 11/2016 | Weston |
| 9,483,906 | B2 | 11/2016 | LeMay et al. |
| 9,491,584 | B1 | 11/2016 | Mendelson |
| 9,523,775 | B2 | 12/2016 | Chakraborty et al. |
| 9,542,579 | B2 | 1/2017 | Mangold et al. |
| 9,563,898 | B2 | 2/2017 | McMahan et al. |
| 9,579,568 | B2 | 2/2017 | Barney et al. |
| 9,582,981 | B2 | 2/2017 | Rokhsaz et al. |
| 9,589,224 | B2 | 3/2017 | Patterson et al. |
| 9,613,237 | B2 | 4/2017 | Nikunen et al. |
| 9,616,334 | B2 | 4/2017 | Weston et al. |
| 9,626,672 | B2 | 4/2017 | Fisher |
| 9,642,089 | B2 | 5/2017 | Sharma et al. |
| 9,646,312 | B2 | 5/2017 | Lyons et al. |
| 9,651,992 | B2 | 5/2017 | Stotler |
| 9,661,450 | B2 | 5/2017 | Agrawal et al. |
| 9,675,878 | B2 | 6/2017 | Barney et al. |
| 9,680,533 | B2 | 6/2017 | Gudan et al. |
| 9,692,230 | B2 | 6/2017 | Biederman et al. |
| 9,696,802 | B2 | 7/2017 | Priyantha et al. |
| 9,706,924 | B2 | 7/2017 | Greene |
| 9,707,478 | B2 | 7/2017 | Barney et al. |
| 9,713,766 | B2 | 7/2017 | Barney et al. |
| 9,731,194 | B2 | 8/2017 | Briggs et al. |
| 9,737,797 | B2 | 8/2017 | Barney et al. |
| 9,741,022 | B2 | 8/2017 | Ziskind et al. |
| 9,743,357 | B2 | 8/2017 | Tabe |
| 9,747,538 | B2 | 8/2017 | Gudan et al. |
| 9,748,632 | B2 | 8/2017 | Rokhsaz et al. |
| 9,754,139 | B2 | 9/2017 | Chemishkian et al. |
| 9,754,202 | B2 | 9/2017 | Gudan et al. |
| 9,756,579 | B2 | 9/2017 | Zhou et al. |
| 9,762,292 | B2 | 9/2017 | Manian et al. |
| 9,767,649 | B2 | 9/2017 | Dabrowski |
| 9,770,652 | B2 | 9/2017 | Barney et al. |
| 9,813,855 | B2 | 11/2017 | Sahadi et al. |
| 9,814,973 | B2 | 11/2017 | Barney et al. |
| 9,831,724 | B2 | 11/2017 | Copeland et al. |
| 9,836,103 | B2 | 12/2017 | Kramer et al. |
| 9,837,865 | B2 | 12/2017 | Mitcheson et al. |
| 9,854,581 | B2 * | 12/2017 | Shaw .................... H04W 4/021 |
| 9,861,887 | B1 | 1/2018 | Briggs et al. |
| 9,864,882 | B1 | 1/2018 | Geist et al. |
| 9,867,024 | B1 | 1/2018 | Larson |
| 9,871,298 | B2 | 1/2018 | Daniel et al. |
| 9,909,896 | B2 | 3/2018 | Bass et al. |
| 9,928,527 | B2 | 3/2018 | Woycik et al. |
| 9,928,681 | B2 | 3/2018 | LeMay, Jr. et al. |
| 9,931,578 | B2 | 4/2018 | Weston |
| 9,936,357 | B2 | 4/2018 | Mills et al. |
| 9,949,219 | B2 | 4/2018 | Belogolovy |
| 9,972,894 | B2 | 5/2018 | Dion et al. |
| 9,993,724 | B2 | 6/2018 | Barney et al. |
| 1,001,079 | A1 | 7/2018 | Weston et al. |
| 1,002,262 | A1 | 7/2018 | Barney et al. |
| 10,058,793 | B2 | 8/2018 | Cortelyou et al. |
| 10,238,976 | B2 * | 3/2019 | Ackley .................... A63F 13/211 |
| 2009/0069935 | A1 | 3/2009 | Wieland |
| 2010/0144239 | A1 | 6/2010 | Eck et al. |
| 2012/0154633 | A1 * | 6/2012 | Rodriguez .......... H04M 1/72569 |
| | | | 348/231.99 |
| 2012/0286938 | A1 | 11/2012 | Cote et al. |
| 2013/0073087 | A1 | 3/2013 | Irmler |
| 2013/0130585 | A1 | 5/2013 | Eck |
| 2013/0226588 | A1 | 8/2013 | Irmler |
| 2013/0324059 | A1 | 12/2013 | Lee et al. |
| 2013/0332509 | A1 * | 12/2013 | Schwartz ................ G07C 11/00 |
| | | | 709/203 |
| 2014/0122170 | A1 | 5/2014 | Padgett et al. |
| 2014/0162693 | A1 | 6/2014 | Wachter et al. |
| 2015/0046202 | A1 | 2/2015 | Hunt |
| 2015/0078140 | A1 | 3/2015 | Riobo Aboy et al. |
| 2015/0138556 | A1 | 5/2015 | LeBoeuf et al. |
| 2015/0194817 | A1 | 7/2015 | Lee et al. |
| 2015/0236551 | A1 | 8/2015 | Shearer et al. |
| 2015/0255226 | A1 | 9/2015 | Rouvala et al. |
| 2015/0312517 | A1 | 10/2015 | Hoyt et al. |
| 2015/0336013 | A1 | 11/2015 | Stenzler et al. |
| 2015/0371194 | A1 | 12/2015 | Marshall et al. |
| 2016/0001193 | A1 * | 1/2016 | Eck .......................... A63J 7/005 |
| | | | 446/26 |
| 2016/0019423 | A1 | 1/2016 | Ortiz et al. |
| 2016/0020636 | A1 | 1/2016 | Khlat |
| 2016/0020637 | A1 | 1/2016 | Khlat |
| 2016/0067600 | A1 | 3/2016 | Barney et al. |
| 2016/0144280 | A1 | 5/2016 | Pawlowski et al. |
| 2016/0170998 | A1 | 6/2016 | Frank et al. |
| 2016/0179075 | A1 * | 6/2016 | Shin ........................ H04W 4/70 |
| | | | 700/275 |
| 2016/0182165 | A1 | 6/2016 | Margon et al. |
| 2016/0203663 | A1 | 7/2016 | Proctor |
| 2016/0217496 | A1 | 7/2016 | Tuchman et al. |
| 2016/0226610 | A1 | 8/2016 | Pinzon Gonzales, Jr. |
| 2016/0307398 | A1 | 10/2016 | Walker et al. |
| 2016/0316324 | A1 | 10/2016 | Sahadi et al. |
| 2016/0321548 | A1 | 11/2016 | Ziskind et al. |
| 2016/0373522 | A1 | 12/2016 | Carlos et al. |
| 2017/0091850 | A1 | 3/2017 | Alvarez et al. |
| 2017/0093463 | A1 | 3/2017 | Wang et al. |
| 2017/0115018 | A1 | 4/2017 | Mintz |

(56) References Cited

U.S. PATENT DOCUMENTS

| | | |
|---|---|---|
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0014385 A1 | 1/2018 | Wein |
| 2018/0078853 A1 | 3/2018 | Barney et al. |
| 2018/0147728 A1 | 5/2018 | Vyas et al. |
| 2018/0214769 A1 | 8/2018 | Briggs et al. |
| 2018/0318723 A1 | 11/2018 | Weston |
| 2018/0339226 A1 | 11/2018 | Barney et al. |
| 2018/0350144 A1* | 12/2018 | Rathod ............... G06Q 20/3276 |
| 2019/0009171 A1 | 1/2019 | Barney et al. |
| 2019/0038970 A1 | 2/2019 | Weston et al. |
| 2019/0098099 A1* | 3/2019 | Goslin ................. A61B 5/1118 |
| 2019/0176027 A1* | 6/2019 | Smith ................ G06K 9/00664 |
| 2019/0188061 A1* | 6/2019 | Scanlon .................. G06F 9/546 |
| 2019/0220635 A1* | 7/2019 | Yeh ..................... G06K 19/0723 |

FOREIGN PATENT DOCUMENTS

| | | |
|---|---|---|
| JP | 2004126791 A | 4/2004 |
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |

OTHER PUBLICATIONS

U.S. Appl. No. 16/196,967, filed Nov. 20, 2018, Matthew Usi.
U.S. Appl. No. 15/826,357, filed Nov. 29, 2017, Wei Yeh.
U.S. Appl. No. 15/833,839, filed Dec. 6, 2017, Travis Jon Cossairt.
U.S. Appl. No. 15/861,502, filed Jan. 3, 2018, Wei Cheng Yeh.
U.S. Appl. No. 15/874,671, filed Jan. 18, 2018, Wei Cheng Yeh.
U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/882,738, filed Jan. 29, 2018, Travis Jon Cossairt.
PCT/US2019/016895 International Search Report and Written Opinion dated Apr. 12, 2019.

* cited by examiner

INTERACTIVE ANIMATED CHARACTER HEAD SYSTEMS AND METHODS

BACKGROUND

The present disclosure relates generally to amusement parks. More specifically, embodiments of the present disclosure relate to systems and methods utilized to provide amusement park experiences.

Amusement parks and other entertainment venues contain, among many other attractions, animated characters that interact with guests. For example, the animated characters may walk around the amusement park, provide entertainment, and speak to the guests. Certain animated characters may include a performer in a costume with an animated character head that covers the performer's face. With the increasing sophistication and complexity of attractions, and the corresponding increase in expectations among guests, more creative animated character head systems and methods are needed to provide an interactive and personalized experience for guests.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive system includes one or more processors that are configured to receive a first signal indicative of an activity of a user within an environment and to receive a second signal indicative of the user approaching an animated character head. The one or more processors are also configured to provide information related to the activity of the user to a base station control system associated with the animated character head in response to receipt of the second signal to facilitate a personalized interaction between the animated character head and the user.

In an embodiment, an interactive system includes one or more identification devices configured to detect an identifier supported by a wearable device of a user. The interactive system also includes one or more processors configured to monitor activities of the user within an environment based on respective signals received from the one or more identification devices. The one or more processors are further configured to output a respective signal based on the activities of the user to an animated character head, thereby causing the animated character head to present an animation that is relevant to the activities of the user to facilitate a personalized interaction between the animated character head and the user.

In an embodiment, a method includes receiving, at one or more processors, a signal indicative of a user approaching an animated character head. The method also includes accessing, using the one or more processors, information related to a prior activity of the user. The method further includes providing, using the one or more processors, the information related to the prior activity of the user to a base station control system associated with the animated character head in response to receipt of the signal to facilitate a personalized interaction between the animated character head and the user.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, games, performance shows, and animated characters. However, many of the forms of entertainment do not vary based upon a guest's previous activities (e.g., experiences and/or actions). For example, an animated character may greet each guest in a similar manner. Some guests may prefer a unique or customized interaction with the animated character that is different for each guest, different during each interaction, and/or that indicates recognition of the guest's previous activities. Accordingly, the present embodiments relate to an interactive system that monitors a guest's activities within an amusement park and provides an output to control or influence an animated character's interaction with the guest based at least in part on the guest's previous activities.

More particularly, the present disclosure relates to an interactive system that uses an identification system, such as a radio-frequency identification (RFID) system, to monitor a guest's activities within an amusement park. In an embodiment, the guest may wear or carry a device that supports an identifier, such as an RFID tag. When the guest brings the device within a range of a reader (e.g., RFID transceiver) positioned within the amusement park, the reader may detect the identifier and provide a signal to a computing system to enable the computing system to monitor and to record (e.g., in a database) the guest's activities within the amusement park. For example, the reader may be positioned at an exit of a ride (e.g., a roller coaster or other similar attraction), and the reader may detect the identifier in the device as the guest exits the ride. The reader may provide a signal indicating that the device was detected proximate to the exit of the ride to the computing system, the computing may then determine that the guest completed the ride based on the signal, and the computing system may then store the information (e.g., that the guest completed the ride) in the database.

Subsequently, the guest may visit an animated character, which may be located in another portion of the amusement park. In an embodiment, the animated character includes an animated character head worn by a performer. An additional reader (e.g., RFID transceiver) positioned proximate to the animated character (e.g., coupled to the animated character, carried by the performer, coupled to a base station control system, or coupled to a stationary structure or feature within the amusement park) may detect the identifier in the device as the guest approaches the animated character. The additional reader may provide a signal to the computing system indicating that the device was detected proximate to the animated character, the computing system may then determine that the guest is approaching the animated character based on the signal, the computing system may then access the information stored in the database, and the computing system may then provide an output to control or influence the animated character's interaction with the guest based on the information. For example, the computing system may be in communication with the base station control system, which may be a tablet or other computing device (e.g., mobile phone) operated by a handler who travels with and/or provides support to the performer wearing the animated character head. In some such cases, the computing system may provide an output to the base station control system that causes display of the information (e.g., the guest's score in a game, the rides completed by the guest) and/or a recommended interaction (e.g., congratulate the guest on winning a game) on a display screen of the base station control system. The handler may then select an appropriate phrase and/or gesture for the animated character, such as by providing an input at the base station control system (e.g., making a selection on a touch screen) that causes the animated character to speak the phrase and/or to perform the gesture. In an embodiment, the handler may suggest an appropriate phrase and/or gesture for the animated character, such as by speaking (e.g., via a two-way wireless communication system) to the performer wearing the animated character head.

Each guest may have had different, respective experiences and/or carried out different, respective actions in the amusement park. For example, one guest may experience a ride, earn virtual points by playing a game, and eat at a restaurant, while another guest may experience a different ride, earn a different number of virtual points by playing the game, and eat at a different restaurant. The disclosed interactive system may enable the animated character to carry out a unique, personalized interaction with each guest by speaking or gesturing based on each guest's particular activities. To facilitate discussion, a user of the interactive system is described as being a guest at an amusement park and the interactive system is described as being implemented in the amusement park; however, it should be appreciated that the interactive system may be implemented in other environments. Furthermore, the disclosed embodiments refer to an animated character head worn by a performer; however, it should be appreciated that the interactive system may additionally or alternatively include and affect operation of other components, such as objects (e.g., cape, hat, glasses, armour, sword, button) held, worn, or carried by the performer.

Figure 1:
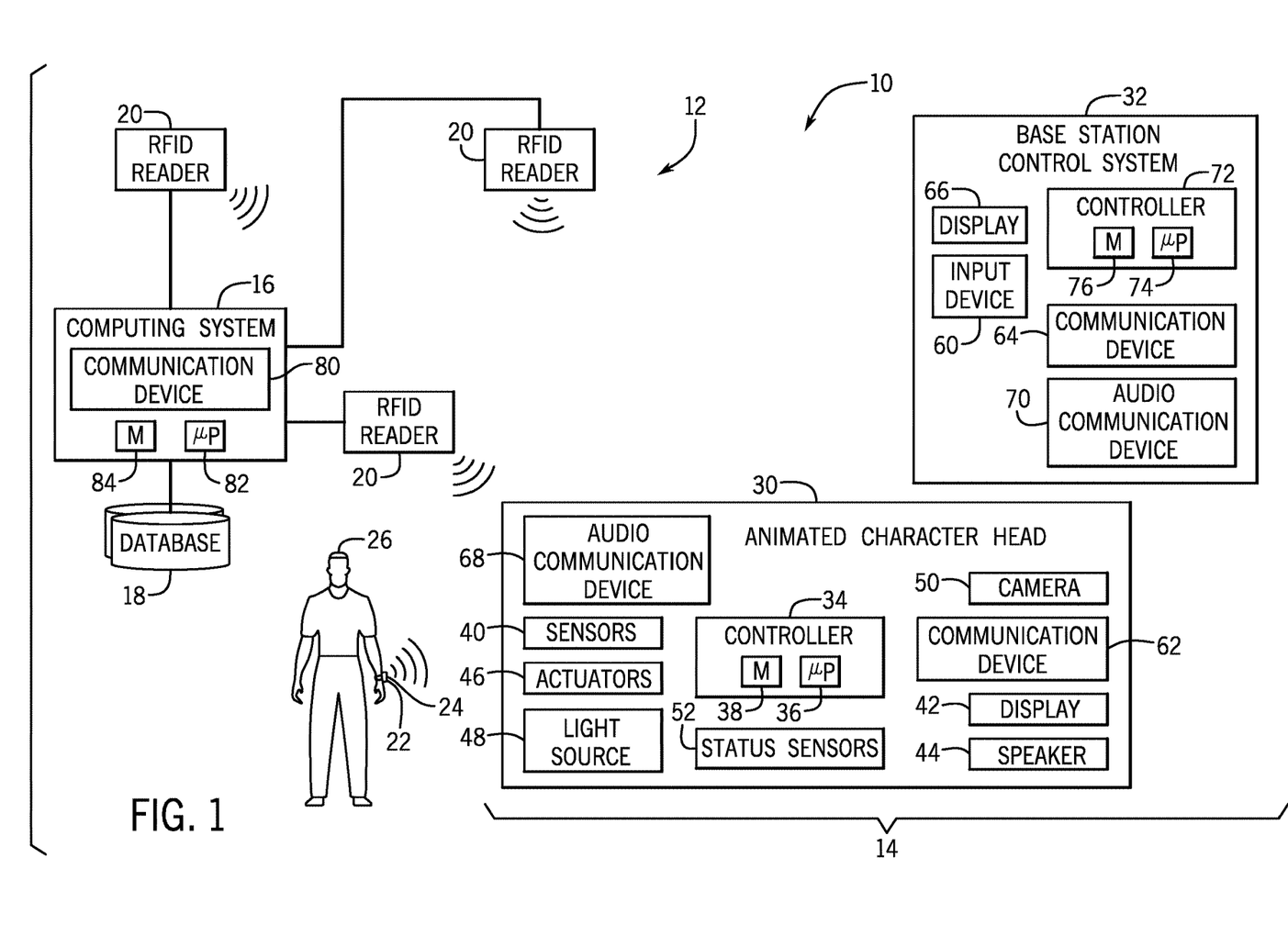
FIG. 1 is a block diagram of an interactive system having an animated character head, in accordance with an embodiment.

With the foregoing in mind, FIG. 1 is a block diagram of an interactive system 10 that may be utilized in an environment, such as an amusement park. As illustrated in FIG. 1, the interactive system 10 includes an identification system 12 (e.g., an RFID system) and an animated character system 14. In an embodiment, the identification system 12 includes a computing system 16 (e.g., a cloud-based computing system), one or more databases 18, and one or more readers 20 (e.g., RFID readers or transceivers) that are configured to read an identifier 22 (e.g., RFID tag) supported in a wearable device 24 (e.g., wearable or portable device, such as a bracelet, necklace, charm, pin, or toy), which may be worn or carried by a user 26. As discussed in more detail below, the identification system 12 may monitor activities of the user 26 as the user 26 travels through the amusement park, and the identification system 12 may provide an output indicative of previous activities of the user 26 to the animated character system 14, thereby facilitating a unique, personalized interactive experience for the user 26.

In one embodiment, the animated character system 14 includes an animated character head 30 that may be worn by a performer and that may be configured to emit sounds (e.g., speak phrases) and/or carry out various gestures (e.g., eye blinks, jaw motions, lip shapes). The animated character system 14 may also include a base station control system 32 (e.g., remote control system) that may be operated by a handler who travels with and/or provides support to the performer wearing the animated character head 30. In an embodiment, the animated character head 30 and the base station control system 32 are communicatively coupled, such that an input by the handler at the base station control system 32 causes the animated character head 30 to emit a certain sound or perform a certain gesture.

More particularly, in one embodiment, the animated character head 30 may include a controller 34 (e.g., electronic controller) with one or more processors 36 and one or more memory devices 38. In an embodiment, the memory 36 may be configured to store instructions, data, and/or information, such as a library of animations (e.g., database of available animations, including sounds and/or gestures, and corresponding control instructions for effecting the animations) for the animated character head 30. In an embodiment, the processor 36 may be configured to receive an input (e.g., signal from the base station control system 32), to identify an appropriate animation from the library of animations (e.g., a selected animation) based on the received input, and/or to provide one or more appropriate control signals to a display 42, a speaker 44, an actuator 46, and/or a light source 48 based on the received input and/or in accordance with the selected animation. In this way, the animated character head 30 may enable the handler to control the speech and/or gestures of the animated character head 30. It should be appreciated that the library of animations may include separate sounds or small sound clips (e.g., single word, beep, buzz), separate gestures (e.g., smile, frown, eye blink), and/or combinations of multiple sounds and gestures (e.g., a greeting that includes multiple words in combination with a motion profile that includes smile and eye movements). For example, the base station control system 32 may present the handler with a selection menu of available animations for the animated character head 30, and the handler may be able to provide an input at the base station control system 32 to select a smile and then select a particular greeting. Subsequently, the processor 36 of the animated character head 30 may receive a signal indicative of the handler's input from the base station control system 32, access the selected animations from the library, and control the actuators 46 to effect the smile and the particular greeting.

The animated character head 30 may include various features to facilitate the techniques disclosed herein. For example, the animated character head 30 may include one or more sensors 40 that are configured to monitor the performer and/or to receive inputs from the performer. The one or more sensors 40 may include eye tracking sensors that are configured to monitor eye movement of the performer, machine vision sensors that are configured to monitor movement of the performer's face, microphones or audio sensors that are configured to receive spoken inputs or other audible inputs from the performer, physical input sensors (e.g., switch, button, motion sensors, foot controls, or wearable input device, such as a myo input, ring input, or gesture gloves) that are configured to receive a physical or manual input from the performer, or any combination thereof. The inputs may be processed by the processor 36 to select an animation from the library of animations stored in the memory 38 and/or to otherwise affect the animations presented via the animated character head 30. For example, certain inputs via the one or more sensors 40 may veto or cancel a selection made by the handler and/or certain inputs may initiate a particular animation.

The actuators 46 may be any suitable actuators, such as electromechanical actuators (e.g., linear actuator, rotary actuator). The actuators 46 may be located inside the animated character head 30 and be configured to adjust certain features or portions of the animated character head 30 (e.g., the eyes, eyebrows, cheeks, mouth, lips, ears, light features). For example, a rotary actuator may be positioned inside the animated character head 30 along the outer cusps of the lips of the animated character head 30 to cause the face of the animated character head 30 to smile in response to a control signal (e.g., from the processor 36). As a further example, the animated character head 30 may contain an electric linear actuator that drives the position of the eyebrows (e.g., to frown) of the animated character head 30 in response to a control signal (e.g., from the processor 36).

As shown, the animated character head 30 may include the light source 48, and the duration, brightness, color, and/or polarity of the light emitted from the light source 48 may be controlled based on a control signal (e.g., from the processor 36). In an embodiment, the light source 48 may be configured to project light onto a screen or other surface of the animated character head 30, such as to display a still image, a moving image (e.g., a video), or other visible representation of facial features or gestures on the animated character head 30. In some embodiments, the actuators 46 and/or the light source 48 may enable the animated character head 30 to provide any of a variety of projected facial features or gestures, animatronic facial features or gestures, or combinations thereof.

In an embodiment, the processor 36 may instruct the display 42 to show an indication of available animations (e.g., a list of animations stored in the library in the memory 38), an indication of the selected animation (e.g., selected by the processor 36 from the library in the memory 38 based on an input from the base station control system 32), and/or other information (e.g., information about the user 26, such as prior activities; recommended animations) for visualization by the performer wearing the animated character head 30. For example, in operation, the display 42 may provide a list of available animations, and the one or more sensors 40 may obtain an input from the performer (e.g., an eye tracking sensor may enable the performer to provide the input with certain eye movements) to enable the performer to scroll through the list of available animations and/or to select an animation from the list of available animations. In an embodiment, a selected animation may be shown on the display 42, and the selected animation may be confirmed, changed, modified, switched, delayed, or deleted by the performer via various inputs to the one or more sensors 40 (e.g., by speaking into a microphone or actuating a physical input sensor), thereby enabling efficient updates by the performer during interactions with guests. It should be appreciated that the performer may not have control over the selections, and thus, may not be able to input a selection or change the selection made by the handler via the one or more sensors 40, for example.

The display 42 may be utilized to provide various other information. For example, in some embodiments, a camera 50 (e.g., coupled to or physically separate from the animated character head 30) may be provided to obtain images (e.g., still or moving images, such as video) of the user 26, the surrounding environment, and/or the currently playing animation (e.g., current movements or features of the animated character head 30), which may be relayed to the animated character head 30 (e.g., via wireless communication devices, such as transceivers) for display via the display 42 to provide information and/or feedback to the performer. In an embodiment, the display 42 may be part of augmented or virtual reality glasses worn by the performer.

In an embodiment, the animated character head 30 may include one or more status sensors 52 configured to monitor a component status and/or a system status (e.g., to determine whether a performed animation does not correspond to the selected animation), and an indication of the status may be provided to the performer via the display 42 and/or to the handler via the base station control system 32. For example, a status sensor 52 may be associated with each actuator 46 and may be configured to detect a position and/or movement of the respective actuator 46, which may be indicative of whether the actuator 46 is functioning properly (e.g., moving in an expected way based on the selected animation).

The processor 36 may execute instructions stored in the memory 38 to perform the operations disclosed herein. As such, in an embodiment, the processor 36 may include one or more general purpose microprocessors, one or more application specific processors (ASICs), one or more field programmable logic arrays (FPGAs), or any combination thereof. Additionally, the memory 38 may be a tangible, non-transitory, computer-readable medium that store instructions executable by and data to be processed by the processor 36. Thus, in some embodiments, the memory 38 may include random access memory (RAM), read only memory (ROM), rewritable non-volatile memory, flash memory, hard drives, optical discs, and the like.

The base station control system 32 may include various features to facilitate the techniques disclosed herein. In an embodiment, the handler may utilize an input device 60 (e.g., a touch screen) at the base station control system 32 to provide an input and/or to select animations. In such cases, the handler's selections and/or other data may be transmitted wirelessly or through a wired connection to the animated character head 30 via the communication devices 62, 64. In an embodiment, the handler receives system status information (e.g., an indication of component failure as detected by the status sensors 52, completed animations, images from the camera 50) from the animated character head 30. In an embodiment, if a particular actuator 46 is not functioning properly, animation selections that rely on the particular actuator 46 may be removed from the list of available animations and/or otherwise made inaccessible for selection by the handler.

In an embodiment, the animated character head 30 and the base station control system 32 may include audio communication devices 68, 70 (e.g., a headset or other devices having a microphone and/or a speaker) that enable the performer and the handler to communicate (e.g., verbally communicate via one-way or two-way communication). In such cases, the handler may be able to verbally inform the performer of the handler's current selection, the handler's next selection, information about the user 26, or the like. Additionally, the performer may be able to request a particular animation, indicate a preference to cancel a selected animation, or the like.

In the depicted embodiment, a controller 72 of the base station control system 32 contains a processor 74 that may execute instructions stored in the memory 76 to perform operations, such as receiving, accessing, and/or displaying a selection menu of available animations for the animated character head 30 on a display 66 (which may also operate as the input device 60), providing a signal indicative of a selected animation to the animated character head 30, or the like. As such, in an embodiment, the processor 74 may include one or more general purpose microprocessors, one or more application specific processors (ASICs), one or more field programmable logic arrays (FPGAs), or any combination thereof. Additionally, the memory 76 may be a tangible, non-transitory, computer-readable medium that stores instructions executable by and data to be processed by the processor 74. Thus, in some embodiments, the memory 76 may include random access memory (RAM), read only memory (ROM), rewritable non-volatile memory, flash memory, hard drives, optical discs, and the like.

Furthermore, the communication devices 62, 64 may enable the controllers 34, 72 to interface with one another and/or with various other electronic devices, such as the components in the identification system 12. For example, the communication devices 62, 64 may enable the controllers 34, 72 to communicatively couple to a network, such as a personal area network (PAN), a local area network (LAN), and/or a wide area network (WAN). As noted above, the base station control system 32 may also include the display 66 to enable display of information, such as the selection menu of animations, completed animations, the system status as detected by the status sensors 52, and/or an external images obtained by the camera 50, or the like.

In an embodiment, the animated character system 14 is configured to operate independently of or without the identification system 12. For example, at least at certain times, the handler and/or the performer may provide inputs to play various animations on the animated character head 30 to interact with the user 26 without any information regarding the user's 26 previous activities within the amusement park. In an embodiment, at least at certain other times, the handler and/or the performer may receive information about the user's 26 previous activities within the amusement park from the identification system 12 (e.g., information that the user 26 completed a ride, earned points in a game, or visited an attraction), and the information may be utilized to provide a unique, personalized interactive experience for the user 26. For example, the identification system 12 may provide the information for visualization on one or both of the displays 42, 66, or the identification system 12 may provide the information for visualization by the handler on the display 66 and the handler may be able to verbally communicate the information to the performer using the audio communication devices 68, 70. The information may enable the handler to select a more appropriate animation for the user 26, such as a greeting in which the animated character head 30 congratulates the user 26 on an achievement in a game or in which the animated character head 30 asks the user 26 if the user 26 enjoyed a recent ride.

Additionally or alternatively, the identification system 12 and/or another processing component of the interactive system 10 (e.g., the processor 74) may determine one or more relevant animations for the user 26 based on the information about the user's 26 previous activities within the amusement park. In some such cases, the identification system 12 and/or the another processing component may provide a recommendation to select or to play the one or more relevant animations. The recommendation may be provided by highlighting (e.g., with color, font size or style, position on the screen or in the menu) the one or more relevant animations on one or both of the displays 42, 66, thereby facilitating selection of the one or more relevant animations. Additionally or alternatively, the identification system 12 may cause the base station control system 32 to select and/or the animated character head 30 to play a particular animation (e.g., if the user 26 recently completed the ride, the signal from the identification system 12 received at the processor 74 may cause selection of a greeting related to the ride, and the selection may or may not be overridden or changed by the handler and/or the performer).

More particularly, the identification system 12 operates to monitor the user's 26 activities within an amusement park. In an embodiment, the user 26 may wear or carry the wearable device 24 that supports the identifier 22. When the user 26 brings the wearable device 24 within an area proximate to the reader 20 (e.g., within a reading range of the reader 20), the reader 20 may detect the identifier 22 and provide a signal to the computing system 16 to enable the computing system 16 to monitor and to record (e.g., in the one or more databases 18) the user's 26 activities within the amusement park. For example, one reader 20 may be positioned at an exit of a ride (e.g., a roller coaster or other similar attraction), and the reader may detect the identifier 22 in the wearable device 24 as the user 26 exits the ride. The reader 20 may provide a signal indicating that the wearable device 24 was detected proximate to the exit of the ride to the computing system 16, the computing system 16 may then determine that the user completed the ride based on the signal, and the computing system 16 may then store the information (e.g., that the user completed the ride) in the one or more databases 18. In this way, the identification system 12 may monitor the various activities of the user 26 as the user 26 travels through the amusement park.

Subsequently, the user 26 may visit the animated character head 30, which may be located in another portion of the amusement park. Another reader 20 positioned proximate to the animated character head 30 (e.g., coupled and/or inside to the animated character head 30, carried by the performer, coupled to the base station control system 32, or coupled to a stationary structure or feature within the amusement park) may detect the identifier 22 in the wearable device 24 as the user 26 approaches the animated character head 30. The another reader 20 may provide a signal indicating that the wearable device 24 was detected proximate to the animated character head 30 to the computing system 16 (e.g., via a wireless or wired connection), the computing system 16 may then determine that the user 26 is approaching the animated character head 30 based on the signal, the computing system 16 may then access the information stored in the one or more databases 18, and the computing system 16 may then provide an output to control or influence the animated character head's 30 interaction with the user 26 based on the information. For example, the computing system 16 may be in communication with the base station control system 32 (e.g., via communication devices 64, 80). In some such cases, the computing system 16 may provide an output to the base station control system 32 that causes display of the information and/or a recommended interaction on the display 66 of the base station control system 32. The handler may then select an appropriate animation for the animated character head 30, such as by providing an input at the base station control system 32 that causes the animated character head 30 to speak a particular phrase and/or to perform a particular gesture (e.g., relevant to the information about the user 26). In some such cases, the computing system 16 may provide an output to the animated character head 30 that causes display of the information and/or a recommended interaction on the display 42 of the animated character head 30. In an embodiment, the handler may convey the information and/or provide a recommendation based on the information to the performer, such as by speaking (e.g., via a two-way wireless communication system) to the performer.

In this manner, the interactive system 10 may provide a unique, personalized interactive experience between the user 26 and the animated character head 30. The interactive experience may be different for each user 26 and/or different each time the user 26 visits the animated character head 30. It should be appreciated that any of the features, functions, and/or techniques disclosed herein may be distributed between the identification system 12, the animated character head 30, and the base station control system 32 in any suitable manner. As noted above, the animated character system 14 may be able to operate independently of or without the identification system 12. Similarly, in an embodiment, the animated character head 30 may be able to operate independently of or without the base station control system 32. Thus, it should be appreciated that, in some such cases, the identification system 12 may provide outputs directly to the animated character head 30 (e.g., the processor 36 of the animated character head 30 may process signals received directly from the identification system 12 to select and play an animation from the library).

Certain examples disclosed herein relate to activities that involve interaction with attractions (e.g., rides, restaurants, characters) within the amusement park. In an embodiment, the interactive system 10 may receive and utilize information about the user 26 other than activities within the amusement park to provide the unique, personalized interaction. For example, the interactive system 10 may receive and utilize information about the user's 26 performance in a video game at a remote location (e.g., other than within the amusement park, such as at a home video console or computing system), the user's 26 name, age, or other information provided by the user 26 (e.g., during a registration process or ticket purchasing process), or the like. In an embodiment, the interactive system 10 may receive and utilize information related to the user's preferred language, any unique conditions of the user (e.g., limited mobility, limited hearing, sensitive to loud sounds), or the like. For example, the user 26 may complete a registration process or otherwise have the opportunity to input preferences or other information that is associated with the wearable device 14. When the user 26 approaches the animated character head 30, the preferences or other information may be presented to the handler and/or the performer, may be used to select an animation, and/or may be used to determine a recommended animation. In this way, the animated character head 30 may speak to the user 26 in a language that the user 26 understands and/or interact with the user 26 in a manner that is appropriate for the user 26. Additionally, it should be understood that the illustrated interactive system 10 is merely intended to be exemplary, and that certain features and components may be omitted and various other features and components may be added to facilitate performance, in accordance with the disclosed embodiments.

As shown, the computing system 16 may include a processor 82 configured to execute instructions stored in a memory 84 to perform the operations disclosed herein. As such, in an embodiment, the processor 82 may include one or more general purpose microprocessors, one or more application specific processors (ASICs), one or more field programmable logic arrays (FPGAs), or any combination thereof. Additionally, the memory 84 may be a tangible, non-transitory, computer-readable medium that store instructions executable by and data to be processed by the processor 82. Thus, in some embodiments, the memory 84 may include random access memory (RAM), read only memory (ROM), rewritable non-volatile memory, flash memory, hard drives, optical discs, and the like.

Figure 2:
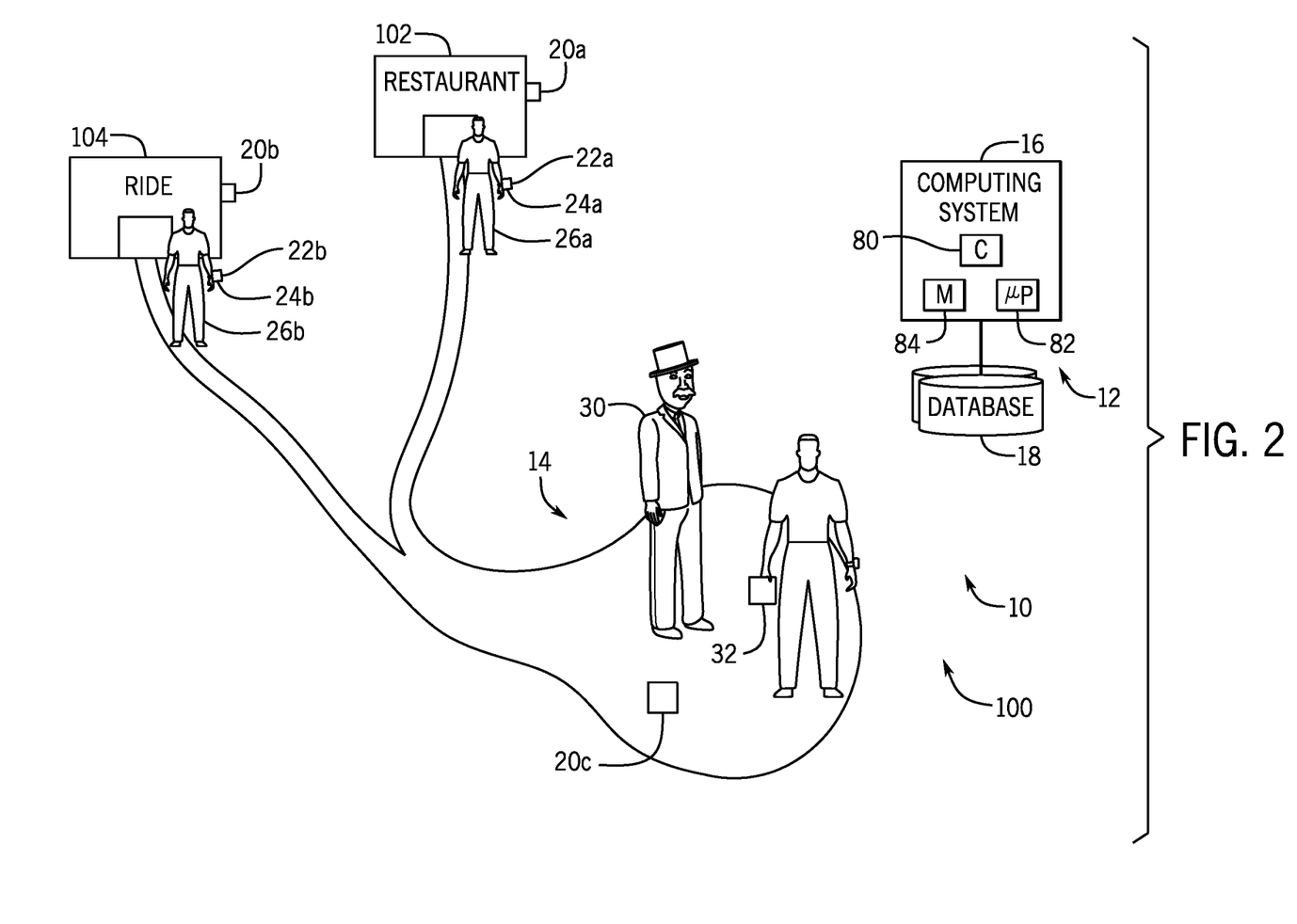
FIG. 2 is a schematic view of an amusement park including the interactive system of FIG. 1, in accordance with an embodiment.

FIG. 2 is a schematic view of an amusement park 100 including the interactive system 10, in accordance with an embodiment. As shown, multiple users 26A, 26B travel through the amusement park 100 and wear respective wearable devices 24A, 24B that support respective identifiers 22A, 22B. The identification system 12 monitors the multiple users 26A, 26B in the manner discussed above with respect to FIG. 1. The animated character system 14 includes the animated character head 30 worn by the performer and the base station control system 32 operated by the handler, and the animated character system 14 may receive information from the identification system 12 to provide a unique, personalized experience for each user 26A, 26B.

With reference to FIG. 2, in operation, the identification system 12 may detect a first user 26A at a restaurant 102 via a first reader 20A and a second user 26B at a ride 104 via a second reader 20B. More particularly, each reader 20A, 20B may read a unique identification code or number from the identifier 22A, 22B supported in each wearable device 24A, 24B. The readers 20A, 20B may provide respective signals indicating detection of the users 24A, 24B to the computing system 16, which determines and records the activities in the one or more databases 18.

At a later time, each user 26A, 26B may approach the animated character head 30. When the first user 26A is within range of a third reader 20C positioned proximate to the animated character head 30, the third reader 20C may provide a signal indicating detection of the first user 24A to the computing system 16. In response, the computing system 16 may provide information regarding the first user's 26A previous activities within the amusement park 100 to the base station control system 32. For example, the computing system 16 may provide information indicating that the first user 26A recently visited the restaurant 102, and the base station control system 32 may provide the information on the display 66 for visualization by the handler. Thus, the handler may be led to select an animation related to the first user's 26A visit to the restaurant, such as to ask the first user 26A whether the first user 26A enjoyed the meal at the restaurant 102. As noted above, the information may be communicated and/or utilized in various other ways to provide the unique, customized interactive experience for the first user 26A. For example, in an embodiment, the computing system 16 may additionally or alternatively determine and provide a recommended animation to the base station control system 32, or the base station control system 32 may determine one or more relevant animations to facilitate selection by the handler.

Similarly, when the second user 26B is within range of the third reader 20C positioned proximate to the animated character head 30, the third reader 20C may provide a signal indicating detection of the second user 24B to the computing system 16. In response, the computing system 16 may provide information regarding the second user's 26B previous activities within the amusement park 100 to the base station control system 32. For example, the computing system 16 may provide information indicating that the second user 26B recently visited the ride 104, and the base station control system 32 may provide the information on the display 66 for visualization by the handler. Thus, the handler may be led to select an animation related to the second user's 26B visit to the ride, such as to ask the second user 26B whether the second user 26B enjoyed the ride 104. As noted above, the information may be communicated and/or utilized in various other ways to provide the unique, customized interactive experience for the second user 26B. For example, in an embodiment, the computing system 16 may additionally or alternatively determine and provide a recommended animation, or the base station control system 32 may determine one or more relevant animations to facilitate selection by the handler.

It should also be appreciated that the third reader 20C may provide respective signals indicating detection of the users 24A, 24B to the computing system 16, which determines and records the interaction with the animated character head 30 in the one or more databases 18. Accordingly, subsequent activities (e.g., at the restaurant 102, the ride 104, or at other attractions, including interactions with other animated character heads) may be varied based on the user's 24A, 24B interaction with the animated character head 30. For example, a game attraction may adjust game elements based on the user's 24A, 24B achievements, including the user's 24A, 24B interaction with the animated character head 30. In an embodiment, another handler may be led to select an animation for another animated character head based on the user's 24A, 24B previous interaction with the animated character head 30. Similarly, should the users 24A, 24B revisit the animated character head 30 (e.g., in the same day or at any later time, including one or more later years), the animated character system 14 may operate in a manner that avoids repeating the same phrase(s), builds off of a prior interaction, or indicates recognition of the user 26 (e.g., states "it is nice to see you again," or "I have not seen you since last year"). For example, some or all of the phrases that were previously spoken may be removed from inventory (e.g., the handler is not given the option to play the phrases), will not be presented to the handler on an initial screen that is viewable to the handler via the base station control system 32 as the user 26 approaches the animated character head 30, and/or will be marked or highlighted as being previously spoken.

Figure 3:
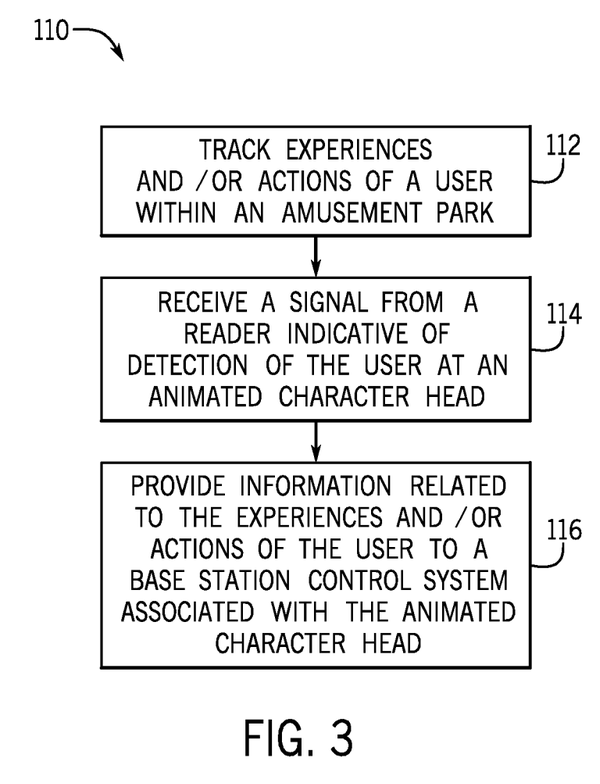
FIG. 3 is a flow diagram of a method of operating the interactive system of FIG. 1, in accordance with an embodiment.

FIG. 3 is a flow diagram of a method 110 of operating the interactive system 10, in accordance with an embodiment. The method 110 includes various steps represented by blocks and references components shown in FIG. 1. Certain steps of the method 110 may be performed as an automated procedure by a system, such as the computing system 16 that may be used within the interactive system 10. Although the flow chart illustrates the steps in a certain sequence, it should be understood that the steps may be performed in any suitable order, certain steps may be carried out simultaneously, and/or certain steps may be omitted, and other steps may be added, where appropriate. Further, certain steps or portions of the method 110 may be performed by separate devices.

In step 112, the computing system 16 tracks (e.g., detects and records) the user's 26 activities within an amusement park. In an embodiment, the user 26 may wear or carry the wearable device 24 that supports the identifier 22. When the user 26 brings the wearable device 24 within range of the reader 20, the reader 20 may detect the identifier 22 and provide a signal to the computing system 16 to enable the computing system 16 to detect and to record (e.g., in the one or more databases 18) the user's 26 activities within the amusement park.

In step 114, the computing system 16 receives a signal indicative of detection of the identifier 22 in the wearable device 24 of the user 26 from one or more readers 20 proximate to the animated character head 30. The computing system 16 may determine that the user 26 is approaching the animated character head 30 based on the signal.

In step 116, in response to receipt of the signal at step 114, the computing system 16 may then access and provide information related to the activities of the user to the base station control system 32 to control or influence the animated character head's 30 interaction with the user 26. For example, the computing system 16 may provide an output to the base station control system 32 that causes display of the information and/or a recommended interaction on the display 66 of the base station control system 32. The handler may then select an appropriate animation for the animated character head 30, such as by providing an input at the base station control system 32 that causes the animated character head 30 to speak a particular phrase and/or to perform a particular gesture (e.g., relevant to the information about the user 26). In this manner, the interactive system 10 may provide a unique, personalized interactive experience between the user 26 and the animated character head 30.

Figure 4:
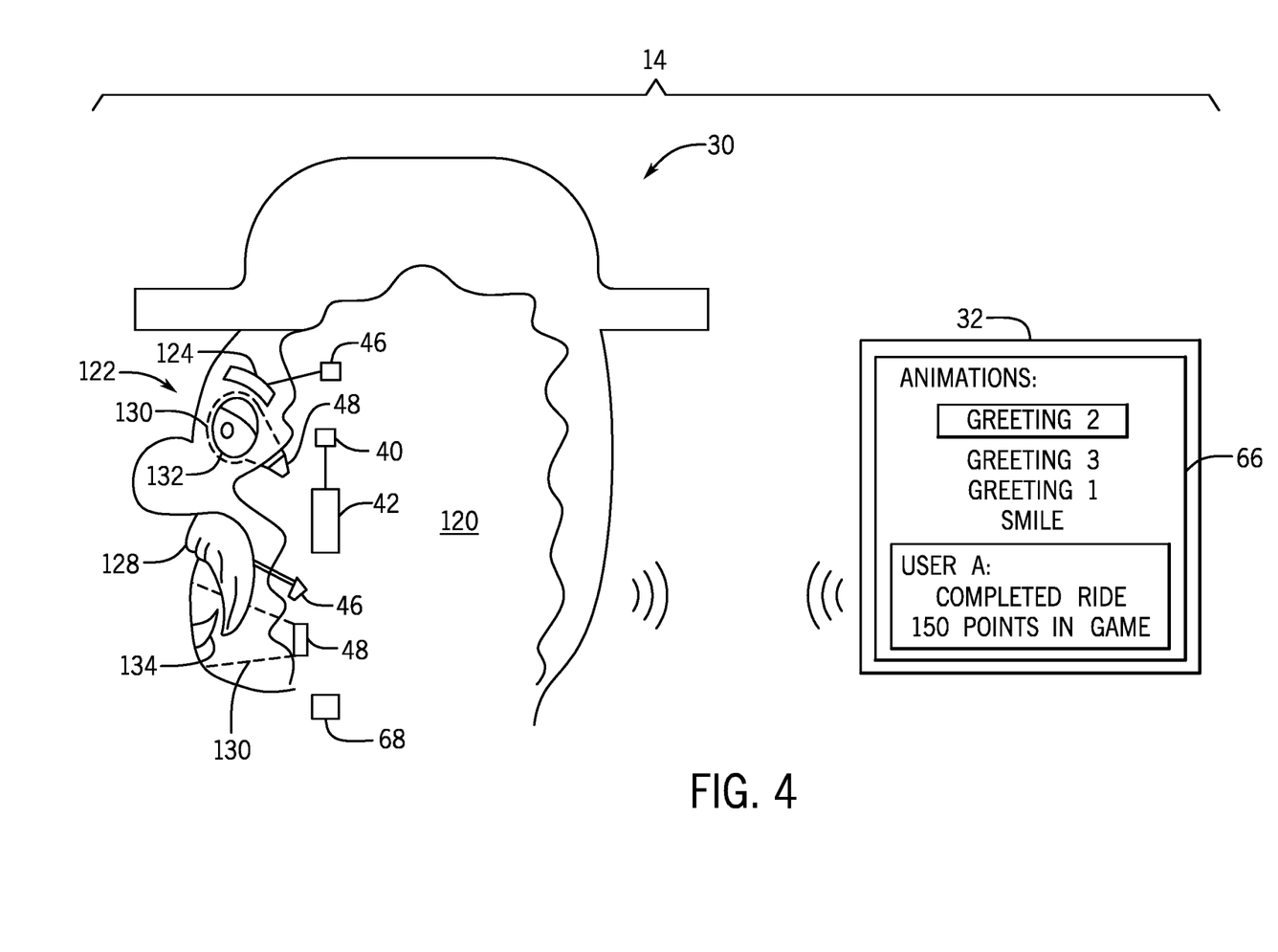
FIG. 4 is a cross-sectional side view of the animated character head and a front view of a base station control system that may be used in the interactive system of FIG. 1, in accordance with an embodiment.

FIG. 4 is a cross-sectional side view of the animated character head 30 and a front view of the base station control system 32 that may be used in the interactive system 10 (FIG. 1), in accordance with an embodiment. As shown, the animated character head 30 includes an opening 120 configured to receive and/or surround a performer's head, and an outer surface 122 (e.g., face) that is visible to the user 26 (FIG. 1). The outer surface 122 may support various features, such as an eyebrow 124 and a mustache 128, which may be actuated via respective actuators 46 based on a control signal (e.g., received from the processor 36, FIG. 1). In an embodiment, screens 130 may be positioned about the animated character head 30 to enable display of certain gestures and/or features, such as an eye 132 and a mouth 134, via light projection onto the screens 130. As discussed above, light sources 48 may be provided to project light onto the screens 130 to display such gestures and/or features in response to receipt of a control signal (e.g., received from the processor 36, FIG. 1). As shown, the animated character head 30 may include the display 42, the one or more sensors 40, and the audio communication device 68, among other components.

The animated character head 30 may be used with the base station control system 32. As shown, the display 66 of the base station control system 32 shows a selection menu of available animations for the animated character head 30. In an embodiment, the animations may be arranged in order of relevance to the user 26 (FIG. 1) that is interacting with the animated character head 30 and/or certain relevant animations are highlighted to assist the handler in creating a unique, personalized interaction for the user 26 (FIG. 1). The display 66 may also present information related to the user 26 (FIG. 1), such as previous activities of the user 26 (FIG. 1). The handler may make a selection (e.g., by touching a corresponding region of the display 66), and the selection may be communicated to the animated character head 30 to effect play of a particular animation. It should be appreciated that the elements shown on the display 66 of the base station control system 32 in FIG. 4 may additionally or alternatively be shown on the display 42 of the animated character head 30.

While the identification system is disclosed as a radio-frequency identification (RFID) system to facilitate discussion, it should be appreciated that the identification system may be or include any of a variety of tracking or identification technologies, such as a Bluetooth system (e.g., Bluetooth low energy [BLE] system), that enable an identification device (e.g., transceiver, receiver, sensor, scanner) positioned within an environment (e.g., the amusement park) to detect the identifier in the device of the user. Additionally, while only certain features of the present disclosure have been illustrated and described herein, many modifications and changes will occur to those skilled in the art. Further, it should be understood that components of various embodiments disclosed herein may be combined or exchanged with one another. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system, comprising one or more processors configured to:
   receive a first signal indicative of a user exiting a game attraction of an amusement park and indicative of a number of points earned by the user within the game attraction;
   receive a second signal indicative of the user approaching an animated character head after exiting the game attraction; and
   provide information related to the points earned by the user within the game attraction to a base station control system associated with the animated character head in response to receipt of the second signal to facilitate a personalized interaction between the animated character head and the user.

2. The interactive system of claim 1, wherein the one or more processors are configured to remove a phrase from an inventory of phrases in response to the phrase being spoken by the animated character head during the personalized interaction with the user such that the phrase is not available to be spoken by the animated character head during a future personalized interaction with the user.

3. The interactive system of claim 1, comprising an identification device positioned within the game attraction, wherein the identification device is configured to generate the first signal in response to detection of an identifier supported by a wearable device of the user.

4. The interactive system of claim 3, wherein the identification device comprises a radio-frequency identification (RFID) reader, and the identifier comprises a RFID tag.

5. The interactive system of claim 1, comprising an identification device positioned proximate to the animated character head, wherein the identification device is configured to generate the second signal in response to detection of an identifier supported by a wearable device of the user.

6. The interactive system of claim 1, comprising the base station control system, wherein the base station control system is configured to display an indication of the points earned by the user on a display screen for visualization by a handler.

7. The interactive system of claim 1, comprising the base station control system, wherein the base station control system is configured to process the information to determine a recommended animation for the animated character head, and to display the recommended animation on a display screen of the base station control system for visualization by a handler.

8. The interactive system of claim 1, wherein the information comprises a recommended animation for the animated character head.

9. The interactive system of claim 1, comprising the base station control system, wherein the base station control system comprises an input device that is configured to receive an animation selection input from a handler and a communication device that is configured to communicate the animation selection input to the animated character head.

10. The interactive system of claim 9, comprising the animated character head, wherein the animated character head comprises one or more respective processors that are configured to receive the animation selection input and to control one or more actuators of the animated character head based on the animation selection input.

11. The interactive system of claim 1, comprising the base station control system and the animated character head, wherein the base station control system and the animated character head comprise respective audio communication devices that enable a handler operating the base station control system to verbally communicate with a performer wearing the animated character head.

12. An interactive system, comprising:
   one or more identification devices configured to detect an identifier supported by a wearable device of a user;
   one or more processors configured to:
      monitor activities of the user within a game attraction of an amusement park based on respective signals received from at least one identification device of the one or more identification devices, wherein the activities of the user within the game attraction are associated with points earned by the user within the game attraction;
      monitor activities of the user outside of the game attraction based on respective signals received from at least one other identification device of the one or more identification devices, wherein the activities of the user outside of the game attraction are associated with the user approaching an animated character head;
      in response to the user approaching the animated character head, output a respective signal based on the points earned by the user within the game attraction to the animated character head, thereby causing the animated character head to present an animation that is relevant to the points earned by the user within the game attraction to facilitate a personalized interaction between the animated character head and the user.

13. The interactive system of claim 12, wherein the one or more identification devices comprise one or more radio-frequency identification (RFID) readers, and the identifier comprises a RFID tag.

14. The interactive system of claim 12, comprising a computing system, a base station control system, and the animated character head, wherein the computing system comprises at least one processor of the one or more processors that is configured to monitor the activities of the user, the base station control system is configured to receive information indicative of the activities of the user from the computing system, the base station control system comprises an input device that is configured to enable a handler to select the animation based on the information indicative of the activities of the user, and the base station control system comprises at least one processor of the one or more processors that is configured to output the respective signal to the animated character head.

15. The interactive system of claim 12, wherein at least one of the one or more identification devices is coupled to the animated character head and is configured to generate a respective signal in response to detection of the identifier supported by the wearable device of the user.

16. A method, comprising:
receiving, at one or more processors, a first signal indicative of a user approaching an animated character head within an amusement park;
accessing, using the one or more processors, information related to a prior activity of the user within the amusement park in response to receiving the first signal indicative of the user approaching the animated character head;
providing, using the one or more processors, the information related to the prior activity of the user to a base station control system associated with the animated character head in response to receipt of the first signal to facilitate a personalized interaction between the animated character head and the user;
receiving, at the one or more processors, a second signal indicative of the user being within a game attraction within the amusement park after departing from the animated character head; and
adjusting, using the one or more processors, one or more game elements within the game attraction based on the personalized interaction between the animated character head and the user.

17. The method of claim 16, wherein the prior activity of the user is associated with points earned by the user within the game attraction.

18. The method of claim 16, comprising receiving, at the one or more processors, another signal indicative of the prior activity of the user from an identification device that is configured to detect an identifier supported by a wearable device of the user.

19. The method of claim 16, comprising receiving the first signal indicative of the user approaching the animated character head from an identification device that is configured to detect an identifier supported by a wearable device of the user.

20. The method of claim 19, wherein the identification device comprises a radio-frequency identification (RFID) reader, and the identifier comprises a RFID tag.

21. The method of claim 16, comprising, using one or more respective processors of the base station control system, processing the information to determine a recommended animation for the animated character head, and displaying the recommended animation on a display screen of the base station control system for visualization by a handler.

22. The method of claim 16, comprising:
receiving, at one or more respective processors of the base station control system, an animation selection input from a handler; and
transmitting, using a communication device of the base station control system, the animation selection input to the animated character head.

23. The method of claim 22, comprising, using one or more respective processors of the animated character head, controlling one or more actuators of the animated character head based on the animation selection input.

* * * * *